UNITED STATES PATENT OFFICE.

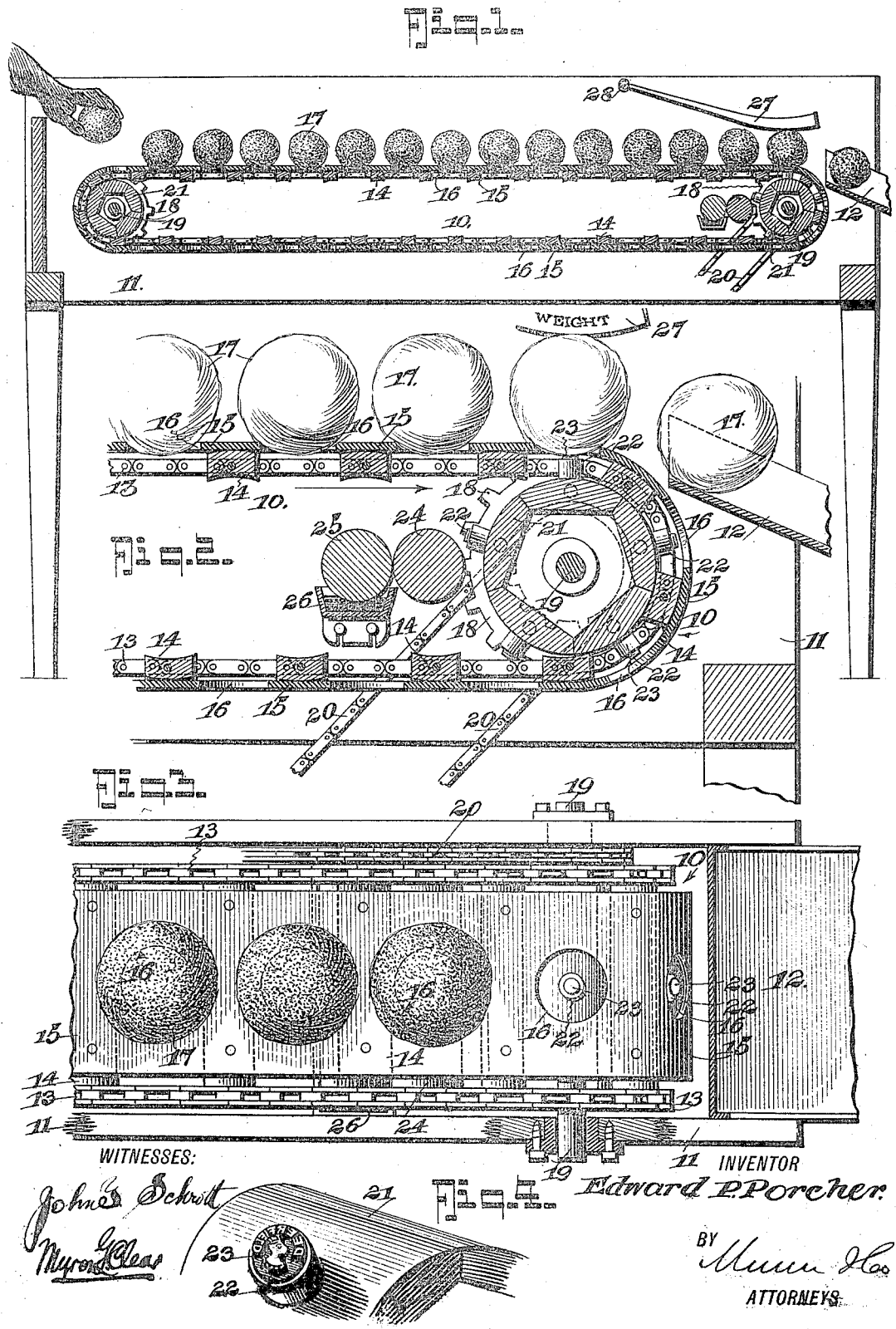

EDWARD P. PORCHER, OF COCOA, FLORIDA.

FRUIT-BRANDING MACHINE.

1,193,297. Specification of Letters Patent. Patented Aug. 1, 1916.

Application filed March 17, 1916. Serial No. 84,807.

*To all whom it may concern:*

Be it known that I, EDWARD P. PORCHER, a citizen of the United States, and a resident of Cocoa, in the county of Brevard and State of Florida, have invented a certain new and useful Improvement in Fruit-Branding Machines, of which the following is a specification.

My present invention relates generally to fruit branding machines, and more particularly to machines for stamping citrus fruit, especially grapefruit and oranges, my object being to provide a speedy, effective arrangement for this purpose, economical in use, and with the attendance of a single operator, to stamp fruit of this nature without danger of injury to the fruit itself.

In the accompanying drawing in which is shown one form of my invention, and which forms a part of this specification; Figure 1 is a vertical longitudinal section. Fig. 2 is an enlarged vertical section through one end of the apparatus, Fig. 3 is a plan view of the parts shown in Fig. 2, and Fig. 4 is a detail perspective view of a portion of the branding roller.

Referring now to these figures, I preferably provide an endless conveyer generally indicated at 10 and mounted within a suitable frame 11, at one end of which free space for the operator is provided, and at the other end of which an inclined discharge plate 12 is secured in order to carry the fruit, after branding to a suitable point of disposition.

The conveyer 10 preferably includes side sprocket chains 13 connected by cross strips 14 spaced apart, and a belt 15 secured to the cross strips and having alined series of openings 16 spaced apart and between the cross strips 14, forming seats for the fruit indicated at 17 particularly in Fig. 1, whereby the latter may be carried upon the upper flight of the conveyer as shown in the figure just mentioned, in alined spaced apart relation.

The side chains 13 pass over sprocket wheels at the opposite ends of the conveyer and as indicated at 18, and the shaft 19 at the delivery end of the conveyer supporting sprocket wheels 18, is provided with another sprocket wheel connected by a sprocket chain 20 to a suitable source of power.

On the shaft 19 just mentioned and intermediate its sprocket wheels 18, is a branding roller 21 which is thus driven in consonance with the conveyer and which is provided with raised bosses 22 at equi-distantly spaced points around its periphery, upon the surface of which bosses are secured the stamps 23 which, being properly spaced, are presented successively at the opening 16 of the belt 15 as the latter rounds the roller 21.

At its inner side the roller 21 is adjacent an inking roller 24 with the periphery of which the several stamps 23 come into contact during rotation of the roller 21, the inking roller 24 being in peripheral engagement with a similar roller 25, the latter of which depends within a supply tank 26 and partly within the ink supply carried by the said tank.

Thus in operation, and as shown best in Fig. 2, the several stamps 23 successively contact with the fruit at a point above the roller 21 vertically alined with its axis, and above this point the frame 11 is preferably provided with a presser-foot in the form of a weighted arm 27 pivoted at one end at 28 and having its other end depending to freely engage the fruit successively as they arrive at the stamping point above the center of roller 21.

The fruit may be separately disposed in the openings 16 by an operator at the receiving end of the conveyer, the openings being sufficiently large to properly seat and maintain the fruit in the relation stated, and, through the means before described, the fruit are successively stamped just before discharge from the conveyer onto the discharge plate 12, an operation which, it is to be noted, may be carried on economically and without danger to the fruit.

I claim:—

1. A fruit branding machine comprising the combination of a conveyer including side sprocket chains and a belt having openings in spaced apart relation and in alined series and forming seats for the fruit, shafts at opposite ends of the conveyer having sprocket wheels engaging the said side chains of the conveyer, a stamping roller around one of said shafts between its sprocket wheels and having a spaced series of stamps therearound, to successively aline with the openings of the belt at the upper portion of the roller, a presser foot mounted above the conveyer and engaging the fruit as it successively arrives above the stamping roller, and a discharge plate receiving the stamped fruit from the delivery end of the conveyer.

2. A fruit branding machine comprising the combination of a conveyer including an endless belt having openings therein spaced apart and in alined series for the reception of the fruit, a stamping roller around which the belt passes at one end of the conveyer, shafts for actuating the conveyer to one of which said stamping roller is secured whereby to rotate in consonance with the conveyer, a plurality of stamping members secured to said roller in spaced apart relation to coincide with the several openings of the belt as the latter arrive above the stamping roller, said stamping members projecting outwardly from the roller to engage the fruit, and inking rollers adjacent the said stamping roller and with which the stamping members successively contact in their movements with the roller.

3. A fruit branding machine comprising the combination of a conveyer including an endless belt having spaced openings in alined series for the reception of the fruit, a stamping roller around which the belt travels at one end of the conveyer having a plurality of peripheral outstanding stamps spaced apart therearound distances equal to the spacing of the belt openings, means for rotating the cylinder in consonance with the belt, and means for successively engaging and holding the fruit in the openings of the belt in their movement across the top of the stamping roller.

4. A branding machine including the combination of an endless conveyer having openings in which the articles to be branded are seated, and a stamping roller around which one end of said conveyer travels, having peripheral stamps and rotating in consonance with the belt whereby to move its stamps successively into contact with the moving articles.

5. A branding machine of the character described, including an endless conveyer having openings therein forming seats for the articles to be branded, a stamping roller having rigid stamp supports thereon and rotating in consonance with the conveyer, and yielding stamp members on said supports.

6. A branding machine of the type described including an endless conveyer having openings therein forming seats for the articles to be branded, a stamping roller having peripheral stamps and rotating in consonance with the conveyer, said roller being arranged in the left of the conveyer and forming a part of the conveyer support, to present its stamps upwardly adjacent each of the openings of the conveyer and against the article seated therein, and means above the conveyer for engaging and holding the articles successively in their seats as the stamps are applied thereto.

EDWARD P. PORCHER.

Witnesses:
A. BUFFARD,
R. B. HOLMES.

Copies of this patent may be obtained for five cents each, by addressing the "Commissioner of Patents, Washington, D. C."